United States Patent
Ogawa et al.

(10) Patent No.: US 7,088,665 B2
(45) Date of Patent: Aug. 8, 2006

(54) OPTICAL DISC RECORDER WITH RECORDING MODALITY SWITCHING FOR HIGH QUALITY RECORDING

(75) Inventors: Atsushi Ogawa, Hamamatsu (JP); Tomoaki Hirai, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 667 days.

(21) Appl. No.: 10/058,435

(22) Filed: Jan. 30, 2002

(65) Prior Publication Data

US 2002/0100861 A1  Aug. 1, 2002

(30) Foreign Application Priority Data

Jan. 26, 2001 (JP) ............................. 2001-019142

(51) Int. Cl.
*G11B 7/00* (2006.01)
(52) U.S. Cl. ................ 369/116; 369/53.37; 369/53.26; 369/53.27
(58) Field of Classification Search ............. 369/53.37, 369/53.26, 53.27, 116
See application file for complete search history.

(56) References Cited

U.S. PATENT DOCUMENTS

| | | | |
|---|---|---|---|
| 4,660,189 A * | 4/1987 | Tsukamura et al. ...... | 369/53.25 |
| 5,315,402 A * | 5/1994 | Ito et al. ...................... | 386/126 |
| 5,579,294 A * | 11/1996 | Ohta et al. ................ | 369/47.31 |
| 6,259,662 B1 | 7/2001 | Matsui | |
| 6,687,202 B1 * | 2/2004 | Watanabe et al. ........ | 369/44.34 |
| 6,711,107 B1 * | 3/2004 | Chao et al. .............. | 369/47.52 |

FOREIGN PATENT DOCUMENTS

| | | |
|---|---|---|
| JP | H08-185663 | 7/1996 |
| JP | 2000-173089 | 6/2000 |
| JP | H11-232772 | 7/2001 |

* cited by examiner

*Primary Examiner*—William R. Korzuch
*Assistant Examiner*—Adam R. Giesy
(74) *Attorney, Agent, or Firm*—Pillsbury Winthrop Shaw Pittman LLP (57) ABSTRACT

An error detector circuit compares a value corresponding to a laser power supplied from a monitor diode of an optical pickup with a value representative of a target laser power, and outputs an error from the target value to a change-over switch. The change-over switch selects one of low-pass filters used for CAV recording and CLV recording. The low-pass filter used for CAV recording has a larger time constant than that of the low-pass filter used for CLV recording. The servo gain of a servo loop during the CAV recording is therefore set smaller than that of a servo loop during the CLV recording. A change in the laser power becomes gentle.

8 Claims, 7 Drawing Sheets

OPTICAL DISC RECORDER WITH RECORDING MODALITY SWITCHING FOR HIGH QUALITY RECORDING

CROSS REFERENCE TO RELATED APPLICATION

This application is based on Japanese patent application 2001-19142, filed on Jan. 26, 2001, the whole contents of which are incorporated herein by reference.

BACKGROUND OF THE INVENTION

A) Field of the Invention

The present invention relates to an information recording apparatus for recording information in discs such as compact disc-recordable (CD-R) and compact disc-rewritable (CD-RW), and to a program for realizing an information recording method.

B) Description of the Related Art

High speed recording at a linear velocity higher than a standard linear velocity (1×linear velocity) has been used for recording data in discs such as CD-R discs and digital versatile disc-recordable (DVD-R).

In high speed recording at a constant linear velocity (CLV), the number of spindle revolutions per minute (rpm) becomes larger in the inner circumferential area of a disc, for example, 8000 rpm in the inner most circumference at a 16×linear velocity. Because of vibrations and the like generated by high speed revolutions, data cannot be recorded correctly in some cases in the disc innermost circumference area.

In a so-called on-the-fly write operation at high speed from a compact disc-read only memory (CD-ROM) drive to a CD-R drive without forming an image file once in a hard disc or the like, according to one method the CD-ROM. drive is driven at a high constant angular velocity (CAV) to reproduce data and the CD-R drive is driven at a high CLV to write the data. The linear velocity of a CD-ROM drive in CAV reproduction is about 32× on the outer circumference side and about 16×on the inner circumference side. The amount of write data during reproduction on the inner circumference side becomes insufficient and a so-called buffer under-run occurs and the write operation fails.

In order to solve such a problem, a CD-R recording method has been proposed which uses CAV recording when data is recorded in a disc on the inner circumference side and CLV recording is used when data is recorded in the disc on the outer circumference side. For example, CAV recording starts at the revolution number corresponding to the linear velocity of 12×at the innermost circumference position, and after the linear velocity at this revolution number reaches 16×, CLV recording starts at the 16×linear velocity. By switching between the CAV recording and CLV recording in accordance with recording positions such as inner and outer sides of a disc, the maximum number of revolutions can be lowered and recording errors and the like can be suppressed.

Data is recorded in a disc such as CD-R and DVD-R by radiating a laser beam to the disc. It is necessary to set the laser power to an optimum value at a high precision in accordance with various factors such as the type of a disc and a linear velocity. So-called automatic laser power control (ALPC) is therefore performed to detect a laser power supplied to a disc in parallel with a recording process and to feedback control the laser power so as to radiate an optimum laser power from a laser diode.

Some recording apparatuses perform running optimum power control (OPC) during CLV recording to adjust a recording beam to have an optimum record power. The optimum power sequentially obtained during such running OPC is set to a target value in accordance with which a radiation laser power is subjected to ALPC to reduce recording errors.

The linear velocity changes with time during CAV recording so that the target value of a laser beam of ALPC changes with time. Namely, as recording is performed sequentially toward the outer circumference side of a disc, i.e., as the linear velocity becomes faster, a larger laser power is set as the target value to feedback control the laser power to make it have the target value. For example, if the linear velocity changes from 1×to 20×, the laser power is required to be changed from about 3 mW to about 35 mW.

Even with the apparatuses of the type that CAV recording is performed on the disc inner circumference side and CLV recording is performed on the disc outer circumference side, it is necessary to perform ALPC for both the CAV and CLV recording. A servo gain of ALPC in an apparatus using conventional CLV recording is set to about 100 Hz. It has been found that the following phenomenon occurs if ALPC is performed during CAV recording at the same servo gain as that of CLV recording.

Now consider a β value which is a parameter representative of the quality of a reproduction signal reproduced from a disc whose data was recorded while ALPC was performed during CAV recording at the same servo gain as that of CLV recording.

Figure 5:
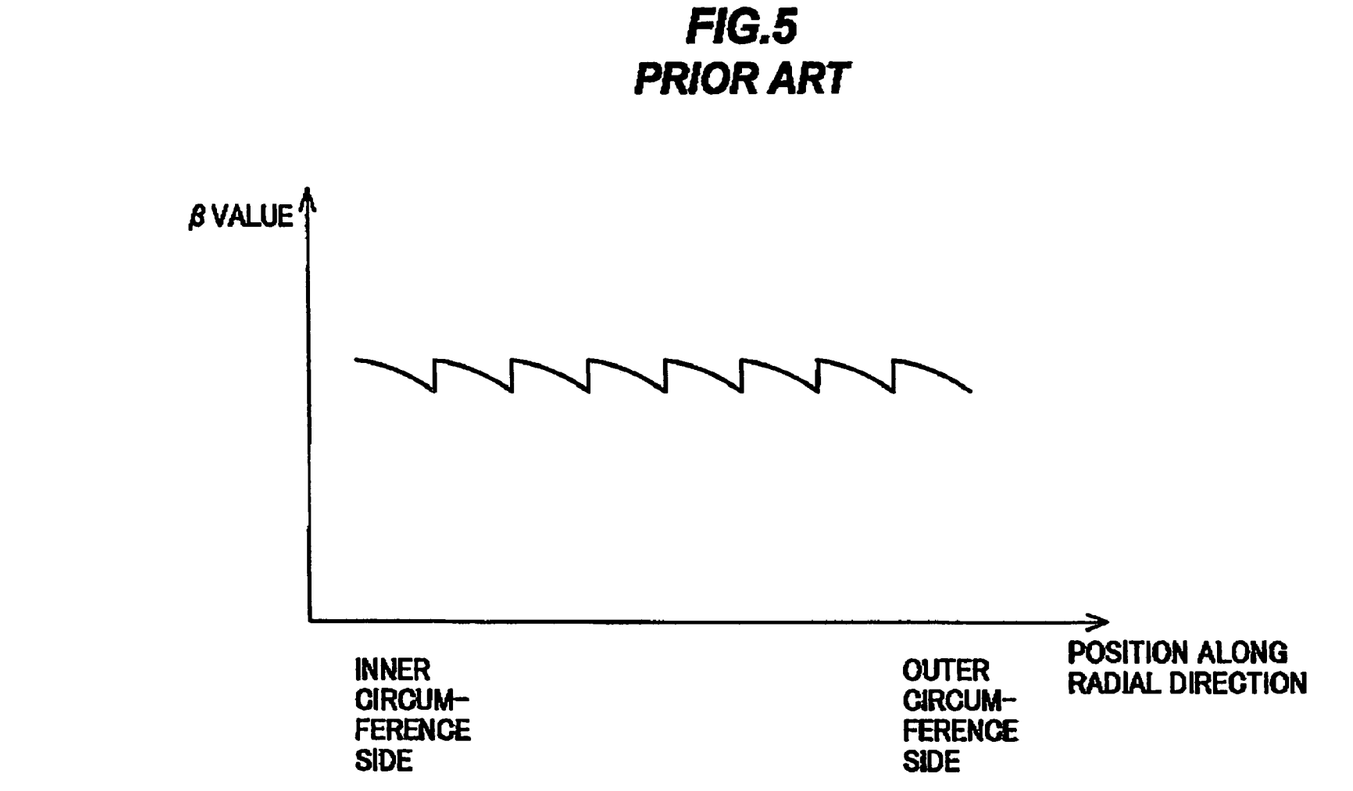
FIG. 5 is a graph showing the relation between a scanning position along a disc radial direction and the β value representative of the quality of a signal reproduced from data of conventional CAV recording.

FIG. 5 is a graph showing a change in the β value relative to a scanning position along the radial direction of a disc. As shown in FIG. 5, it has been found that the β value gradually lowers and then increases stepwise.

The stepwise change in the β value shown in FIG. 5 may be ascribed to the resolution of a laser power which the apparatus can adjust and the β value characteristics as described above. The β value is calculated from (a+b)/(a−b) where a is a peak level (+sign) of the waveform of an eight to fourteen modulation (EFM) signal which is a reception signal returned from an optical pickup, and b is a bottom level (−sign). The β value has the characteristics that it becomes large as the recording laser power becomes large and it becomes small as the linear velocity becomes high. Namely, assuming that the laser power does not change, the β value lowers gradually toward the outer circumference side because the linear velocity becomes high. When the laser power is adjusted (raised), the β value increases. If the adjustment resolution of the laser power is fine, the laser power can be adjusted gently so that the β value also changes gently. Since the actual resolution of a laser power is coarse, the β value changes stepwise as shown in FIG. 5. As the β value changes abruptly, the β value becomes outside the range of good recording characteristics. Therefore, many C1 errors are generated and a percentage of recording errors increases.

SUMMARY OF THE INVENTION

It is an object of the present invention to provide a data recording apparatus capable of lowering a percentage of recording errors for both CAV and CLV recording, and a program realizing an information recording method.

According to one aspect of the present invention, there is provided an information recording apparatus for recording information by radiating a laser beam on a disc, comprising: a disc driver for selectively executing a constant linear velocity mode of driving the disc at a constant linear velocity and a constant angular velocity mode of driving the disc at a constant angular velocity; a laser optical system for radiating a laser beam on the disc; and a controller for detecting a laser power of the laser beam radiated by the laser optical system and controlling the laser power of the laser beam radiated by the laser optical system in such a manner that the detected laser power becomes equal to a target value of a laser power to be radiated, wherein the controller sets a response speed for changing the laser power toward the target value during recording in the constant angular velocity mode slower than a response speed for changing the laser power toward the target value during recording in the constant linear velocity mode.

With this structure, the controller for controlling the laser power switches between the control response speeds in the constant angular velocity mode and constant linear velocity mode to make the response speed in the constant angular velocity mode slower. The laser power therefore changes gently so that generation of record errors to be caused by an abrupt change in the laser power can be suppressed.

As above, a percentage of recording errors for both CAV and CLV recording can be lowered.

DESCRIPTION OF THE PREFERRED EMBODIMENTS

An embodiment of the invention will be described with reference to the accompanying drawings.

A. Structure of Embodiment

Figure 1:
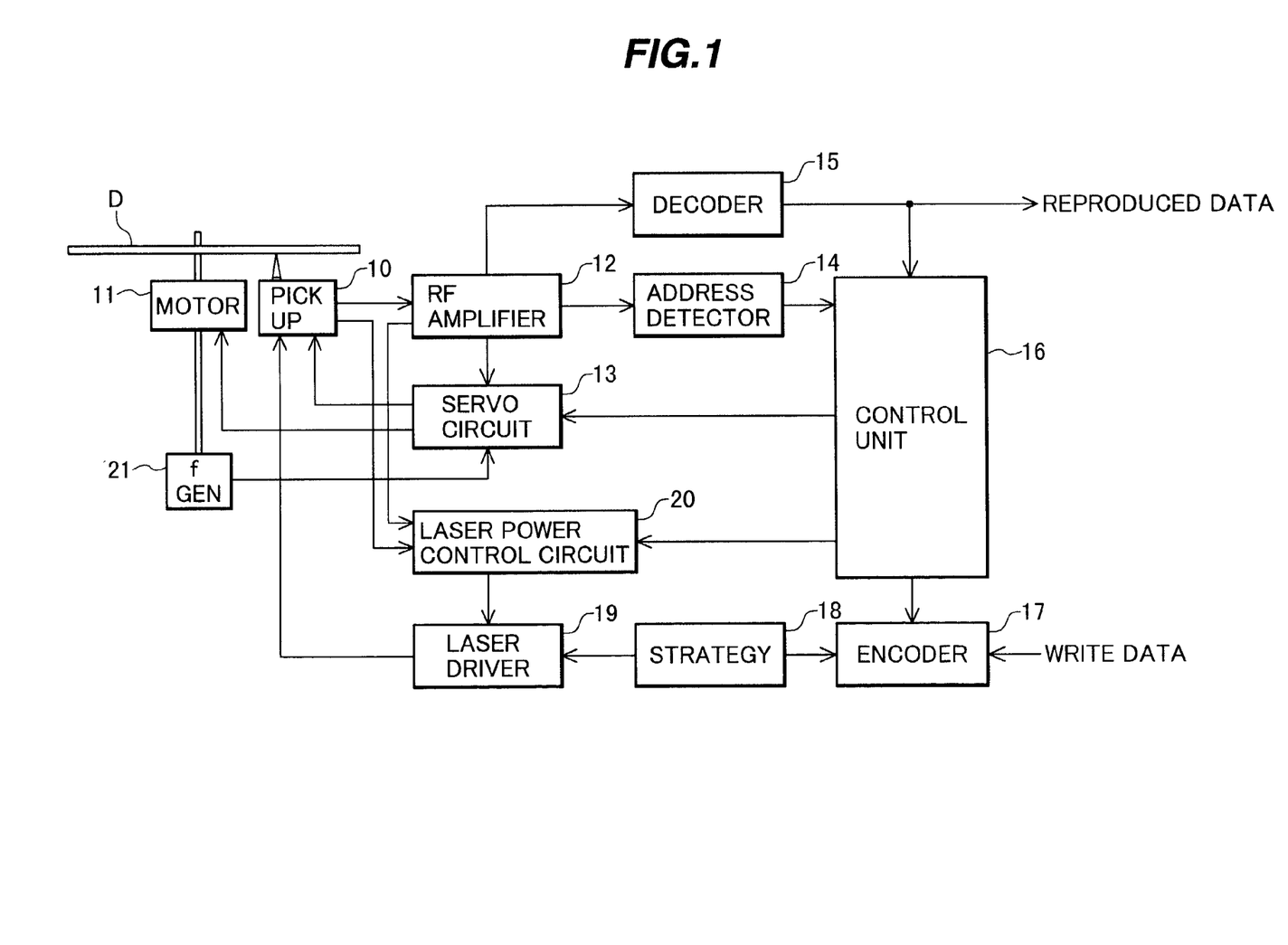
FIG. 1 is a block diagram showing the structure of an optical disc recording/reproducing apparatus according to an embodiment of the invention.

FIG. 1 is a block diagram showing the optical disc recording/reproducing apparatus according to an embodiment of the invention. As shown in FIG. 1, this data recording apparatus has an optical pickup 10, a spindle motor 11, an RF amplifier 12, a servo circuit 13, an address detector circuit 14, a decoder 15, a control unit 16, an encoder 17, a strategy circuit 18, a laser driver 19, a laser power control circuit 20 and a frequency generator 21.

The spindle motor 11 is used for rotating an optical disc (CD-R) D in which data is recorded. The optical pickup 10 has a laser diode, an optical system such as a lens system and a mirror, and a return light receiving element. During recording/reproducing, the optical pickup 10 radiates a laser beam to the optical disc D, receives a return light from the optical disc D, and outputs an EFM signal or received signal to the RF amplifier 12. The optical pickup 10 also has a monitor diode through which current by the return light from the optical disc D flows. This current is supplied to the laser power control circuit 20.

The RF amplifier 12 amplifies the EFM signal supplied from the optical pickup 10, and during recording, outputs the EFM signal to the servo circuit 13, address detector circuit 14 and laser power control circuit 20. During reproduction, the RF amplifier 12 outputs the EFM signal to the circuits 13, 14 and 20 as well as the decoder 15. The decoder 15 EFM-demodulates the received EFM signal to generate reproduced data.

The address detector circuit 14 extracts a wobble signal component from the EFM signal supplied from the RF amplifier 12, demodulates time information (address information) of each position and identification information (disc ID) representative of a disc type, respectively contained in the wobble signal components, and supplies the demodulated information to the control unit 16.

The servo circuit 13 performs revolution control of the spindle motor 11, and focusing control, tracking control and feeding control of the optical pickup 10. The optical disc recording/reproducing apparatus of this embodiment switches between a CAV mode (on the inner circumference side) and a CLV mode (on the outer circumference side) in accordance with the position along the radial direction of the optical disc D. The servo circuit 13 switches between the CAV control and CLV control in accordance with a switch signal supplied from the control unit 16. With the CAV control by the servo circuit 13, the number of revolutions of the spindle motor 11 detected with the frequency generator 21 is controlled to be equal to the preset number of revolutions. With the CLV control by the servo circuit 13, the spindle motor 11 is controlled so that the wobble signal in the EFM signal supplied from the RF amplifier 12 has a preset linear velocity magnification factor.

The encoder 17 EFM-modulates supplied write data and outputs it to the strategy circuit 18. The strategy circuit 18 performs a time axis correction process and the like for the EFM signal supplied from the encoder 17, and outputs it to the laser driver 19. The laser driver 19 drives the laser diode of the optical pickup 10 in accordance with a signal modulated by the write data supplied from the strategy circuit 18 and a laser power drive signal supplied from the laser power control circuit 20.

The laser power control circuit 20 controls the laser power of a laser beam to be radiated from the laser diode of the optical pickup 10. Specifically, the laser power control circuit 20 controls the laser driver 19 in accordance with the value of the current supplied from the monitor diode of the optical pickup 10 and information of the target value of an optical laser power supplied from the control unit 16, so that the laser beam having the optimum laser power can be radiated from the optical pickup 10. The details of the laser power control circuit 20 will be later given.

The control unit 16 is made of a central processing unit (CPU), a read only memory (ROM), a random access memory (RAM) and the like. The control unit 16 controls the whole of the optical disc recording/reproducing apparatus in accordance with a program stored in ROM.

The control unit 16 determines the position along the radial direction of the optical disc D in accordance with the address information supplied from the address detector circuit 14, and when a predetermined position is detected, the control unit 16 outputs a switch control signal for switching between the CAV and CLV modes to the servo circuit 13.

Figure 2:
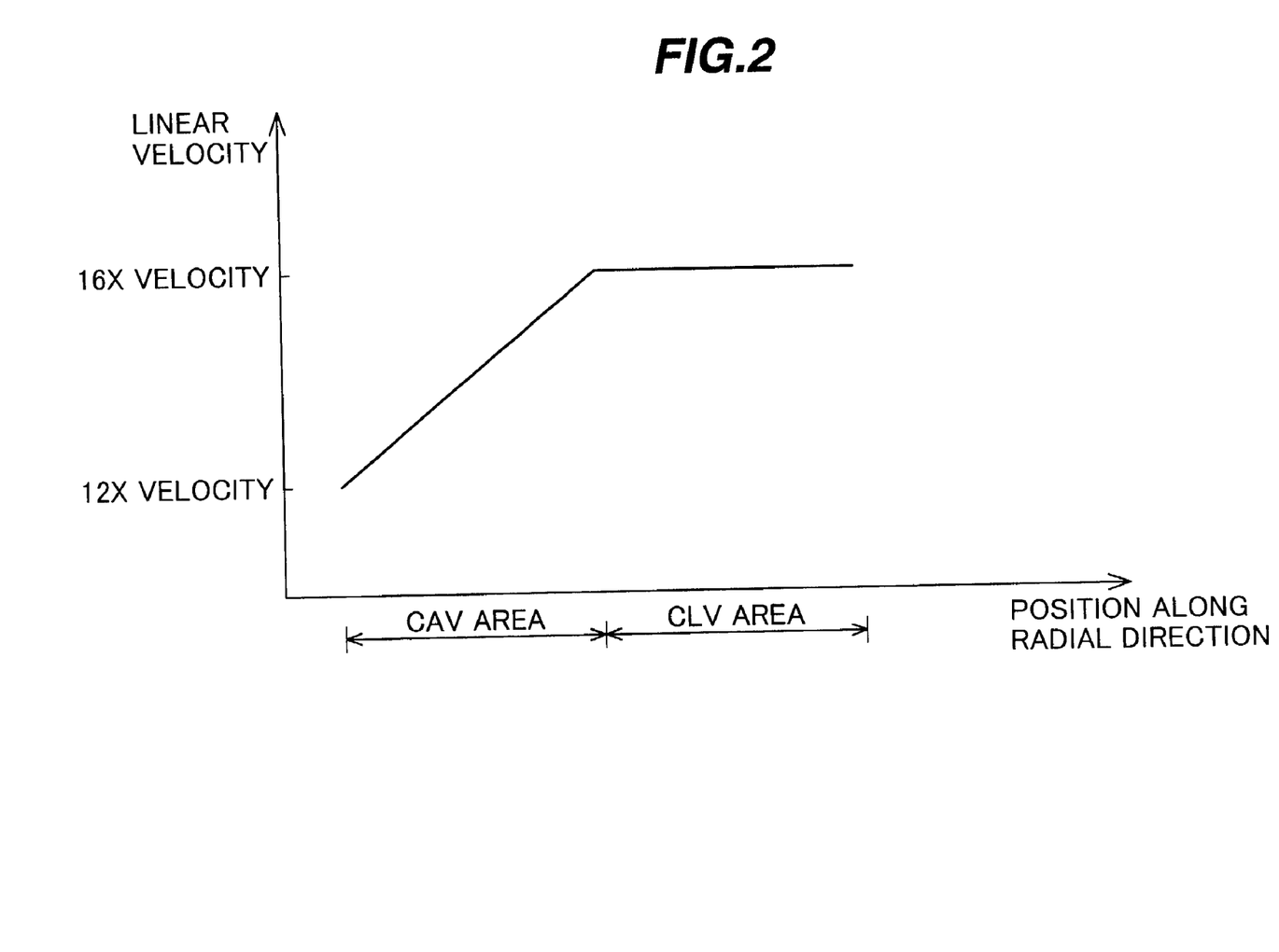
FIG. 2 is a graph showing switching timings between CAV and CLV recording of the above-mentioned optical disc recording/reproducing apparatus.

As shown in FIG. 2, while the spindle motor 11 is driven in the CAV mode at the revolution number corresponding to a 12×linear velocity at the innermost circumference position and when the position along the radial direction at the revolution number corresponding to a 16×linear velocity is detected, the control unit 16 supplies the servo circuit 13 with the switch control signal indicating to change to CLV. After this change, the servo circuit 13 drives the spindle motor 11 in the CLV mode at the 16×linear velocity.

When the control unit 16 switches between the CAV driving and CLV driving of the servo circuit 13, the control unit 16 supplies a control signal representative of the switching between the CAV and CLV driving to the laser power control circuit 20. The laser power control circuit 20 is therefore supplied with the information on whether the spindle motor 11 is CAV-controlled or CLV-controlled in real time.

During CAV recording, the control unit 16 sequentially outputs the information on a target value of the optimum laser power corresponding to the linear velocity, to the laser power control circuit 20. During CAV recording, the linear velocity changes with time. Therefore, the control unit 16 outputs the information on the target value of the laser power optimum to the linear velocity sequentially changing with time. Specifically, as recording is performed sequentially toward the outer circumference side of a disc, i.e., as the linear velocity becomes higher, a larger target value of the laser power is output to the laser power control circuit 20. The target value of the laser power optimum to the linear velocity may be obtained by referring to a data table generated beforehand by experiments or the like. Before actual recording, test recording may be performed in the innermost circumference area of the optical disk D to perform OPC and obtain the laser power target value optimum to each linear velocity from each signal read from the data of test recording.

During CLV recording, the linear velocity does not change so that the target value of a constant optimum laser power is generally output to the laser power control circuit 20. A distance between a recording surface of the optical disc D and the optical pickup 10 may change considerably because of a warped outer circumference area of the optical disc D. In this embodiment, in order to suppress generation of recording errors to be caused by such a warped disc, so-called running OPC for changing the optimum laser power target value in accordance with the return light received signal of the optical pickup 10 supplied from the RF amplifier is performed when necessary.

Figure 3:
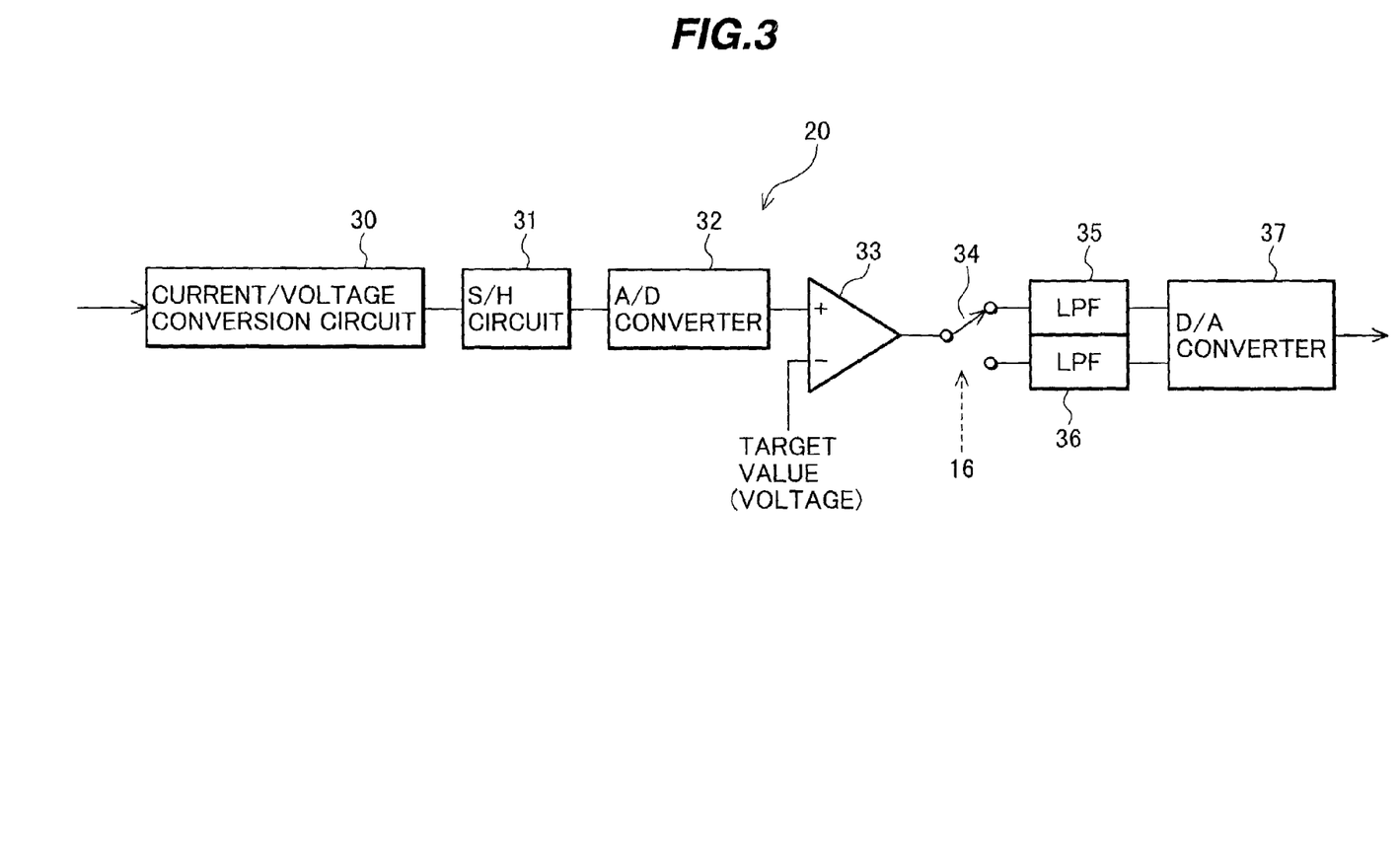
FIG. 3 is a block diagram showing the structure of a laser power control circuit of the above-mentioned optical disc recording/reproducing apparatus.

With reference to FIG. 3, the details of the laser power control circuit 20 will be given. The laser power control circuit 20 controls the laser power in such a manner that the laser power of a laser beam radiated from the laser diode of the optical pickup 10 becomes coincident with the target value of the optimum laser power supplied from the control unit 16.

As shown in FIG. 3, the laser power control circuit 20 has a current/voltage conversion circuit 30, a sample and hold circuit 31, an A/D converter 32, an error detector circuit 33, a change-over switch 34, a low-pass filter 35, a low-pass filter 36 and a D/A converter 37.

The current/voltage conversion circuit 30 converts the current corresponding to the return signal supplied from the monitor diode of the optical pickup 10 into voltage which is supplied to the sample and hold circuit 31. The voltage waveform signal supplied from the current/voltage conversion circuit 30 is supplied via the sample and hold circuit 31 to the A/D converter 32 which converts the analog voltage waveform signal into a digital signal and supplies it to the error detector circuit 33. The error detector circuit 33 is being supplied with a voltage value corresponding to the target value of the optimum laser power from the control unit 16 (refer to FIG. 1). The error detector circuit 33 detects an error or difference between the target value and the voltage value corresponding to the return light to the optical pickup 10 supplied from the A/D converter 32, and outputs a voltage corresponding to the error to the change-over switch 34.

The change-over switch 34 is used for switching between the low-pass filters 35 and 36, and is controlled by the information representative of the drive mode supplied from the control unit 16. Specifically, if the information representative of the CAV driving mode is supplied from the control unit 16, the change-over switch 34 is connected to the low-pass filter 35 to which the voltage corresponding to the error supplied from the error detector circuit 33 is supplied. If the information representative of the CLV driving mode is supplied from the control unit 16, the change-over switch 34 is connected to the low-pass filter 36 to which the voltage corresponding to the error supplied from the error detector circuit 33 is supplied.

The low-pass filters 35 and 36 have different time constants. Namely, the low-pass filter 35 connected to the change-over switch 34 in the CAV driving mode has a larger time constant than that of the low-pass filter 36 connected to the change-over switch 34 in the CLV driving mode.

In the CAV driving mode, the voltage corresponding to the error is supplied from the low-pass filter 35 to the D/A converter 37, whereas in the CLV driving mode, the voltage corresponding to the error is supplied from the low-pass filter 36 to the D/A converter 37. The D/A converter 37 converts the voltage value corresponding to the error or difference between the optimum laser power supplied from one of the low-pass filters and the actual laser power, into an analog signal which is in turn supplied to the laser driver 19. In this manner, in accordance with the signal corresponding to the error from the target value supplied from the laser power control circuit 20, the power of a laser beam to be radiated from the laser diode of the optical pickup 10 is controlled so that a feedback control is performed to make the power of a radiated laser beam become coincident with the optimum laser power.

In this embodiment, the servo loop for making the laser power of a laser beam to be radiated from the laser diode of the optical pickup 10 become coincident with the target value supplied from the control unit 16, is constructed to include the low-pass filter 35 for the CAV driving mode, and is changed to include the low-pass filter 36, in place of the low pass filter 35, in the CLV driving mode. As described above, the time constant of the low-pass filter 35 used for the CAV driving mode is larger than that of the low-pass filter 36 used for the CLV driving mode. Therefore, the servo gain of the servo loop for the CAV recording mode is smaller than that of the servo loop for the CLV recording mode, and a response time required for the laser power for CAV recording mode to reach the target value is longer than that for the CLV recording mode.

B. Operation of Embodiment

Figure 4:
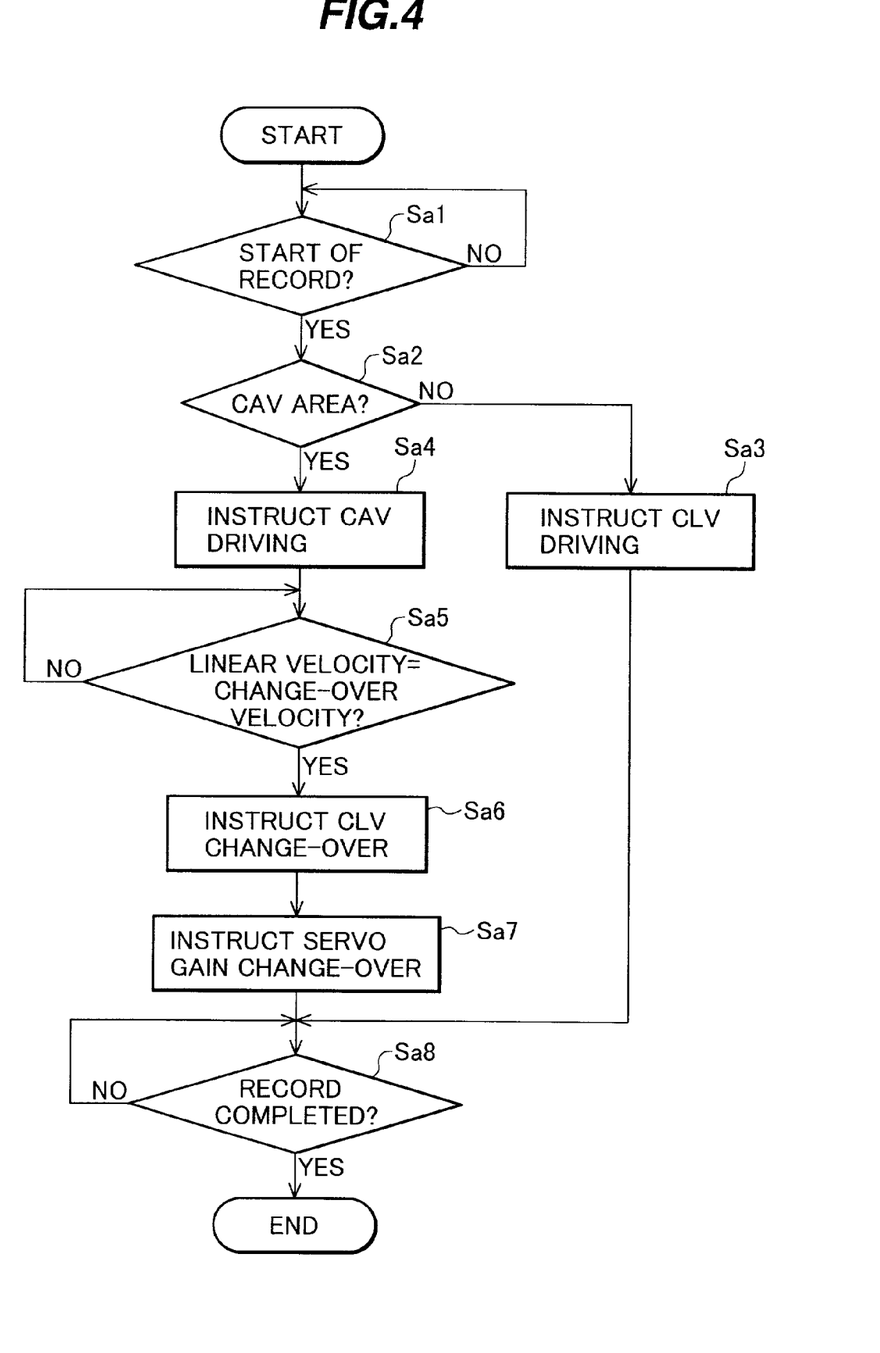
FIG. 4 is a flow chart illustrating the operation of the optical disc recording/reproducing apparatus.

FIG. 4 is a flow chart illustrating the process to be executed by the control unit 16.

First, the control unit 16 judges whether a record start is instructed by a user (Step Sa1). If the record start is instructed, it is judged whether the record start position is in a CAV area (Step Sa2). The CAV area is an area where the CAV driving mode is performed. Specifically, this area is an area from a position where the spindle motor 11 is driven at a revolution number (angular velocity) corresponding to the 12× linear velocity at the innermost circumference position of the optical disc D to a position where the motor 11 is driven at a 16×linear velocity. A CLV area is an outer circumference area than the CAV area, and in this CLV area the optical disc D is driven in the CLV driving mode (refer to FIG. 2).

The control unit 16 judges whether the record start position is in the CAV area, from the address information supplied from the address detector circuit 14. If the record start position is in the CLV area, the control unit 16 instructs the servo circuit 13 to drive the optical disc D by the CLV driving mode (Step Sa3).

If it is judged that the record start position is in the CAV area, the control unit 16 instructs the servo circuit 13 to drive the optical disc D by the CAV driving mode (Step Sa4). As the CAV recording starts, the control unit 16 outputs information representative of the target value of the optimum laser power matching a change in the linear velocity to the laser power control circuit 20 so as to raise the laser power in correspondence with an increase in the linear velocity. The laser power control circuit 20 feedback-controls the laser power to change toward the target value supplied from the control unit 16.

In accordance with the address information detected by the address detector circuit 14, the control unit 16 judges whether the record position of the optical disc D reaches the CLV area, i.e., whether the linear velocity reaches a switching velocity (in this embodiment, a 16×linear velocity) between the CAV and CLV recording modes (Step Sa5). If it is judged that the record position reaches the CLV area, the control unit 16 outputs a control signal to the servo circuit 13, the control signal instructing to change the driving method from CAV driving to CLV driving (Step Sa6).

In addition to that the control unit 16 instructs the servo circuit 13 to change the driving method from CAV driving to CLV driving, the control unit 16 instructs the laser power control circuit 20 to change the servo gain (Step Sa7). In response to this instruction, the laser power control circuit 20 changes the connection of the change-over switch 34 from the low-pass filter 35 used during the CAV driving to the low-pass filter 36. The servo gain of the servo loop controlling the laser power to change toward the target value thereby becomes large. In this manner, the control unit 16 changes the servo gain of the servo loop for controlling the laser power toward the target value, depending on the CAV and CLV recording modes.

After the CLV recording, the control unit 16 judges whether the recording is completed (Step Sa8). This judgement becomes YES if all data are recorded or the user instructs a record end. Then, the recording process is terminated.

In this embodiment, the servo gain of the servo loop for controlling the laser power toward a target value is changed during the CAV and CLV recording modes. Namely, the servo gain during the CAV recording mode is set smaller than that during the CLV recording mode. By lowering the servo gain during the CAV recording mode, it is possible to lower a probability of generation of record errors during the CAV recording mode.

Figure 6:
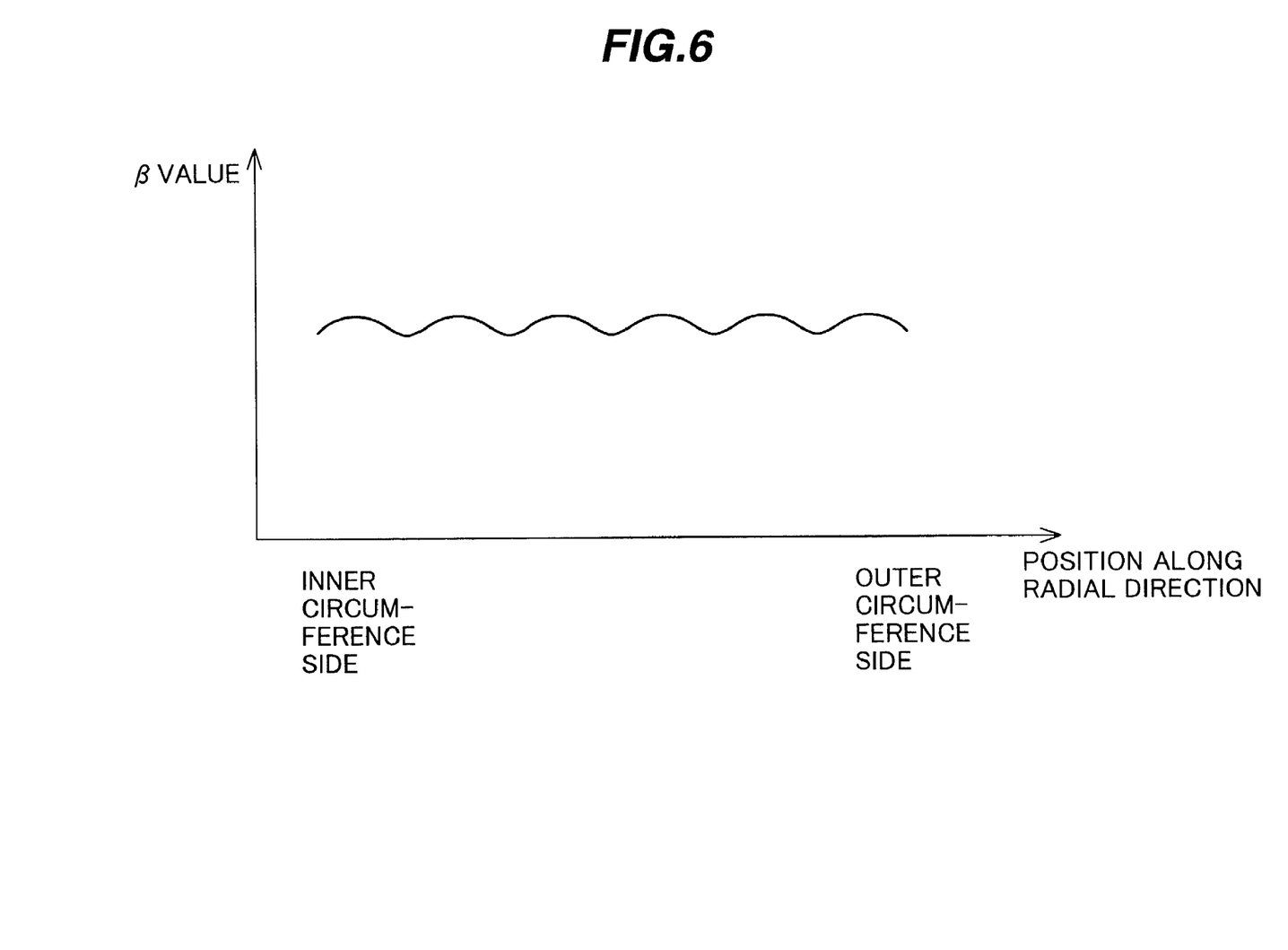
FIG. 6 is a graph showing the relation between a scanning position along a disc radial direction and the β value representative of the quality of a signal reproduced from data of CAV recording by the above-mentioned optical disc recording/reproducing apparatus.

Referring to FIGS. 5 and 6, the reason for this will be described.

FIG. 5 is a graph showing the relation between a scanning position along a disc radial direction and the $\beta$ value representative of the quality of a signal reproduced from data recorded by CAV recording under ALPC by using the same servo gain (about 100 Hz) as that of the CLV method.

FIG. 6 is a graph showing the relation between a scanning position along a disc radial direction and the $\beta$ value when data was recorded during the CAV recording at a smaller servo gain.

As shown in FIG. 5, during CAV recording if the laser power is controlled at the servo gain same as that of CLV recording, the $\beta$ value changes stepwise. A stepwise change in the $\beta$ value may be ascribed to the resolution of the laser power which the apparatus can adjust and the $\beta$ value characteristics, i.e., the characteristics that the $\beta$ value becomes large when the record laser power is made large and becomes smaller when the linear velocity is made slower. Namely, the $\beta$ value gradually lowers because the linear velocity becomes larger toward the outer circumference area if the laser power is constant, and the $\beta$ value becomes large when the laser power is adjusted (raised).

As shown in FIG. 6, during CAV recording if the laser power is controlled at the servo gain smaller than that of CLV recording, the $\beta$ value changes gently.

Figure 7A:
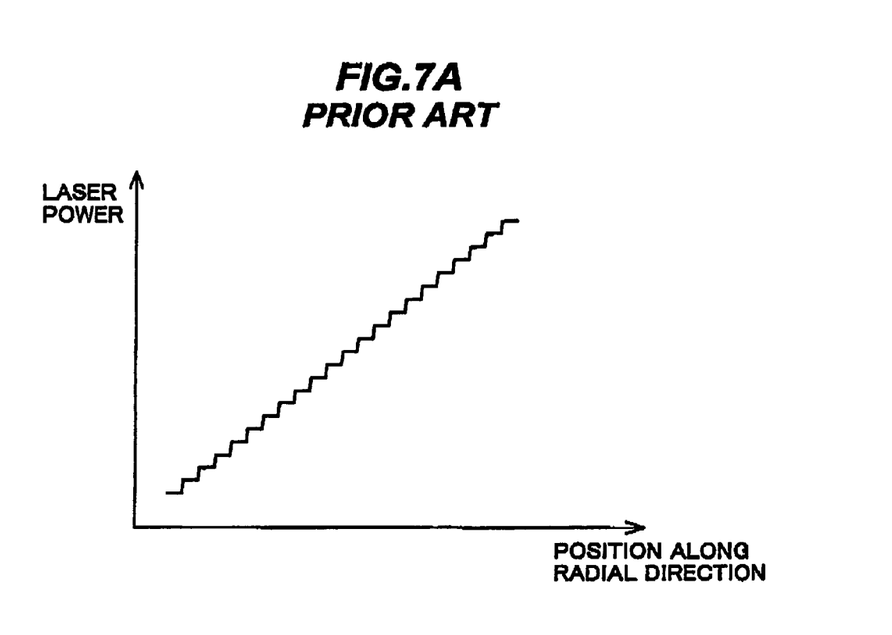
FIGS. 7A and 7B are graphs showing the relations between a laser power and a position along a disc radial direction, respectively of the above-mentioned optical disc recording/reproducing apparatus and a conventional recording/reproducing apparatus.
Figure 7B:
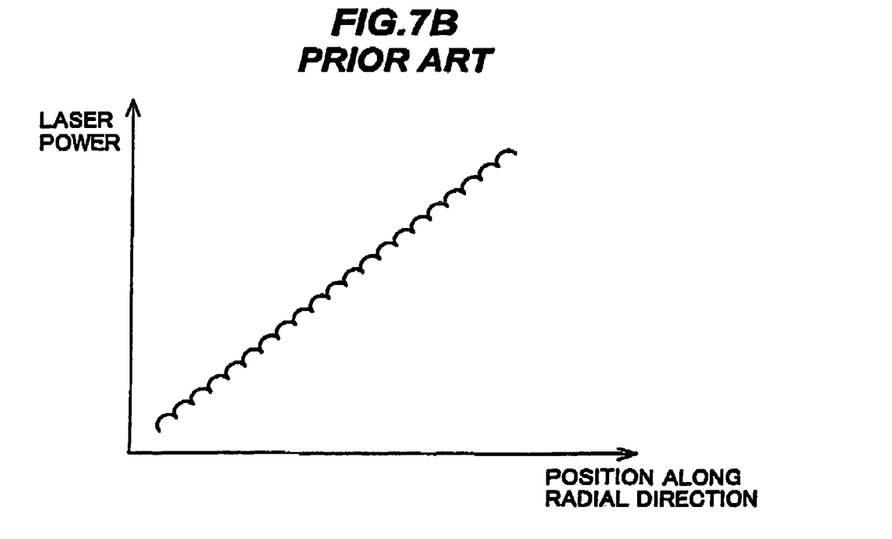

With reference to FIGS. 7A and 7B the reason for this will be described. As shown in FIG. 7A, if the servo gain is large, a response speed of the laser power toward the target value is fast so that the laser power changes stepwise. Therefore, as shown in FIG. 5, the $\beta$ value increasing as the laser power is raised changes stepwise. As shown in FIG. 7B, if the servo gain is small, a response speed of the laser power toward the target value is slow so that the laser power changes gently toward the target value. The $\beta$ value therefore changes gently. As above, by lowering the servo gain, an abrupt change in the laser power does not occur. A probability of generation of C1 errors to be caused by the abrupt change in the laser power can be lowered and a probability of generation of record errors can be lowered.

The servo gain during CLV recording may also be lowered. However, the target value of the laser power in the CLV recording mode is generally constant. The laser power is controlled when it becomes necessary to change the target value because of a large warp or the like of a disc. In the CLV recording mode, the target value changes abruptly when a warp or the like of a disc exists, whereas in the CAV recording mode the target value changes regularly and stepwise. Therefore, if the servo gain is raised to change the laser power rapidly, the probability of generation of C1 errors or the like becomes large accidentally and temporarily. Such a large probability does not occur frequently as in the case of CAV recording in which the C1 error generation probability rises too often by a regular and stepwise change in the target value. Furthermore, if the servo gain is lowered during CLV recording, although the increase in the error generation probability by an accidental change in the laser power is suppressed, the response speed of the laser power to the optimum target value is lowered and hence the error generation probability may increase thereby. The latter is a more serious problem.

In this embodiment, by paying attention to the above-described point, the serve gain during CAV recording is set lower than that during CLV recording, so that the record error generation probability during CAV recording to be caused by an abrupt change in the laser power is lowered without increasing the record error generation probability during CLV recording.

The control unit 16 for executing the record process including the servo gain switching process may be realized by a specialized hardware circuit, or the record process may be realized by software by using an arithmetic and logic circuit such as CPU executing a program stored in a storage medium such as ROM. Various recording media such as CD-ROM and floppy discs storing a 20 program for making a computer execute the record process may be provided to users, or the program may be provided to users via transmission media such as the Internet.

The present invention has been described in connection with the preferred embodiments. The invention is not limited only to the above embodiments. It will be apparent to those skilled in the art that various modifications, improvements, combinations, and the like can be made.

We claim:

1. An information recording apparatus for recording information by radiating a laser beam on a disc, comprising;
    a disc driver for selectively executing a constant linear velocity mode of driving the disc at a constant linear velocity and a constant angular velocity mode of driving the disc at a constant angular velocity;
    a laser optical system for radiating a laser beam on the disc; and
    a controller for detecting a laser power of the laser beam radiated by said laser optical system and controlling the laser power of the laser beam radiated by said laser optical system in such a manner that the detected laser power becomes equal to a target value of a laser power to be radiated,
    wherein said controller sets a response speed for changing the laser power from a first value to a second value during recording in the constant angular velocity mode slower than a response speed for changing the laser power from the first value to the second value during recording in the constant linear velocity mode.

2. The information recording apparatus according to claim 1, further comprising a target value setter for changing a target value in accordance with a linear velocity at a record position of the disc during recording in the constant angular velocity mode.

3. The information recording apparatus according to claim 1, wherein said disc driver drives the disc in the constant angular velocity mode during recording of the disc until the linear velocity at the record position reaches a predetermined velocity, and drives the disc in the constant linear velocity mode after the linear velocity reaches the predetermined velocity.

4. An information recording apparatus comprising;
    a disc driver for selectively executing a constant linear velocity mode of driving a disc at a constant linear velocity and a constant angular velocity mode of driving the disc at a constant angular velocity, when information is recorded in the disc by radiating a laser beam on the disc;
    a laser optical system for radiating a laser beam on the disc;
    a detector for detecting a laser power of the laser beam radiated by said laser optical system; and
    a processor provided with software for controlling the laser power of the laser beam radiated by said laser optical system such that the laser power detected with said detector becomes equal to a target value of a laser power to be radiated, said processor setting a response speed for adjusting the laser power from a first value to a second value during recording in the constant angular velocity mode slower than a response speed for adjusting the laser power from the first value to the second value during recording in the constant linear velocity mode.

5. A driving method for a recording medium, comprising;
    (a) determining a record start instruction for a disc;
    (b) determining whether a record position is in a constant angular velocity area;
    (c) instructing a constant angular velocity drive and setting a first servo gain of a servo-loop controlling the laser power, if the record position is in the constant angular velocity area;
    (d) detecting a transition from the constant angular velocity area to a constant linear velocity area; and
    (e) instructing a constant linear velocity drive and setting a second servo gain of the servo-loop controlling the laser power larger than the first servo gain, if the transition is detected.

6. The driving method for a recording medium according to claim 5, further comprising;
    (f) instructing a constant linear velocity drive and setting a second servo gain of the servo-loop controlling the laser power larger than the first servo gain, if the record position is not in the constant angular velocity area.

7. A computer-readable medium having encoded thereon a program having instructions which when executed cause a processor to;
    (a) determine a record start instruction for a disc;
    (b) determine whether a record position is in a constant angular velocity area;
    (c) instruct a constant angular velocity drive and setting a first servo gain of a servo-loop controlling laser power, if the record position is in the constant angular velocity area;
    (d) detect a transition from the constant angular velocity area to a constant linear velocity area; and
    (e) instruct a constant linear velocity drive and setting a second servo gain of the servo-loop controlling the laser power larger than the first servo gain, if the transition is detected.

8. The computer-readable medium according to claim 7, further causing the processor to;
    (f) instruct a constant linear velocity drive and setting the second servo gain of the servo-loop controlling the laser power larger than the first servo gain, if the record position is not in the constant angular velocity area.

* * * * *

UNITED STATES PATENT AND TRADEMARK OFFICE
CERTIFICATE OF CORRECTION

PATENT NO.        : 7,088,665 B2                             Page 1 of 1
APPLICATION NO.   : 10/058435
DATED             : August 8, 2006
INVENTOR(S)       : Atsushi Ogawa and Tomoaki Hirai It is certified that error appears in the above-identified patent and that said Letters Patent is hereby corrected as shown below:

On title page, item 22, Filed:
 replace "January 30, 2002"
 with --January 25, 2002--.

Signed and Sealed this

Nineteenth Day of December, 2006

JON W. DUDAS
*Director of the United States Patent and Trademark Office*